United States Patent [19]

Polster

[11] 4,362,094
[45] Dec. 7, 1982

[54] COOKING TIME CONTROL SYSTEM

[76] Inventor: Louis S. Polster, 28034 Cero Dr., Saugus, Calif. 91350

[21] Appl. No.: 902,986

[22] Filed: May 4, 1978

Related U.S. Application Data

[63] Continuation of Ser. No. 732,214, Oct. 14, 1976, abandoned, which is a continuation of Ser. No. 627,089, Oct. 30, 1975, abandoned.

[51] Int. Cl.³ .............................................. A47J 23/12
[52] U.S. Cl. ........................................ 99/342; 99/410
[58] Field of Search .................. 99/285, 328, 333–338, 99/342, 344, 403, 407, 410–416, 421 TP, 493; 340/227, 228 R; 73/352, 362 R; 219/450, 499, 504, 505; 338/28

[56] References Cited

U.S. PATENT DOCUMENTS

| | | | |
|---|---|---|---|
| 3,326,692 | 6/1967 | Martino et al. | 99/111 |
| 3,589,269 | 6/1971 | Weir | 99/342 |
| 3,830,105 | 8/1974 | Horsch | 338/28 |
| 3,924,101 | 12/1975 | Beard | 219/504 |
| 3,979,056 | 9/1976 | Barnes | 99/333 |

*Primary Examiner*—Leonard D. Christian
*Attorney, Agent, or Firm*—Allan M. Shapiro

[57] ABSTRACT

This system controls the cooking time of foods such as french fried potatoes that are cooked in a medium, typically hot fat that may change in temperature during cooking. A platinum resistance temperature transducer senses the temperature of the medium and is connected to circuitry that produces a voltage indicative of the cooking rate of the food at the sensed temperature. This voltage controls the frequency of a train of cooking rate pulses that are counted, starting when cooking is begun. When a preset number of pulses have been counted, an indicator goes on to show that cooking is complete.

32 Claims, 7 Drawing Figures

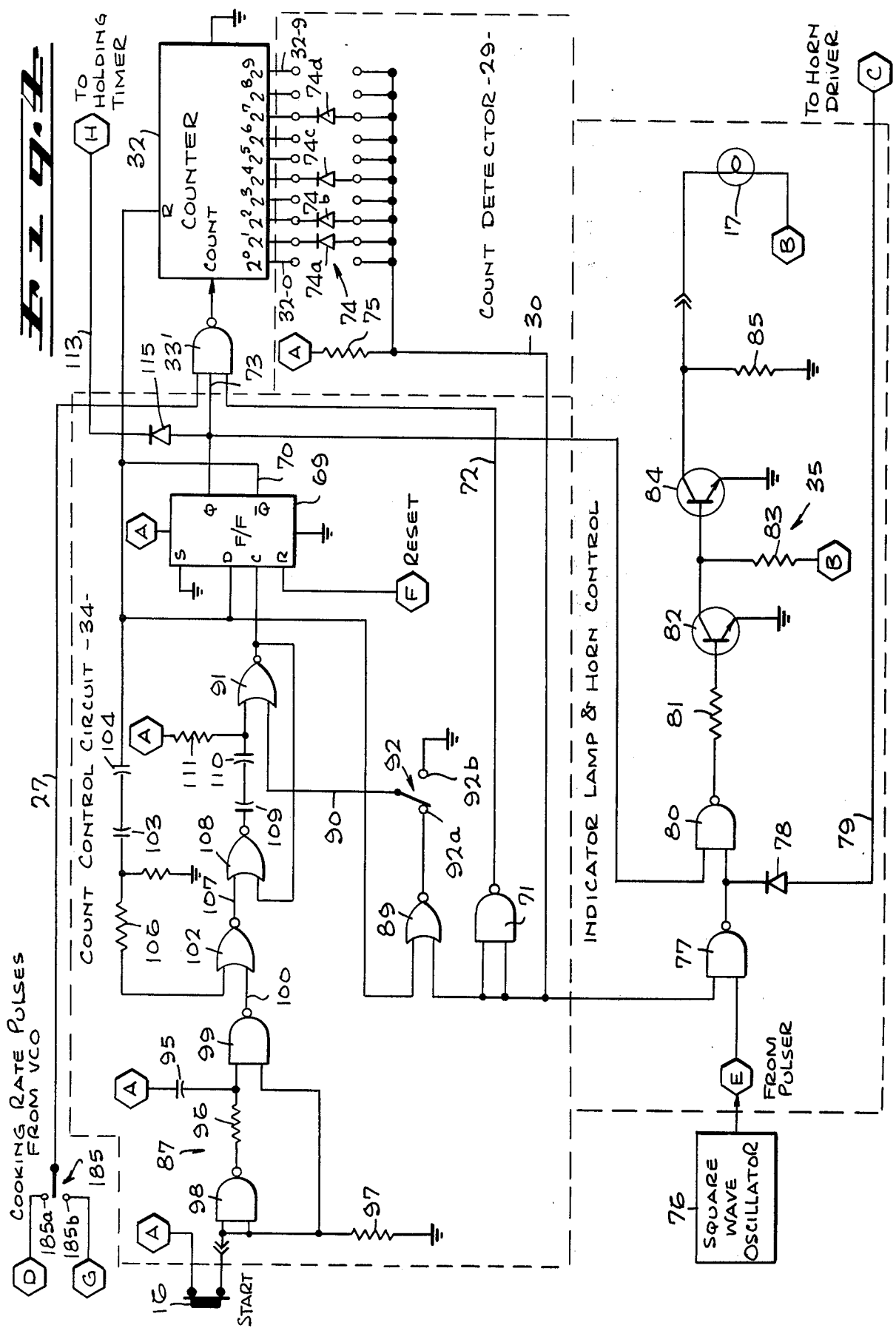

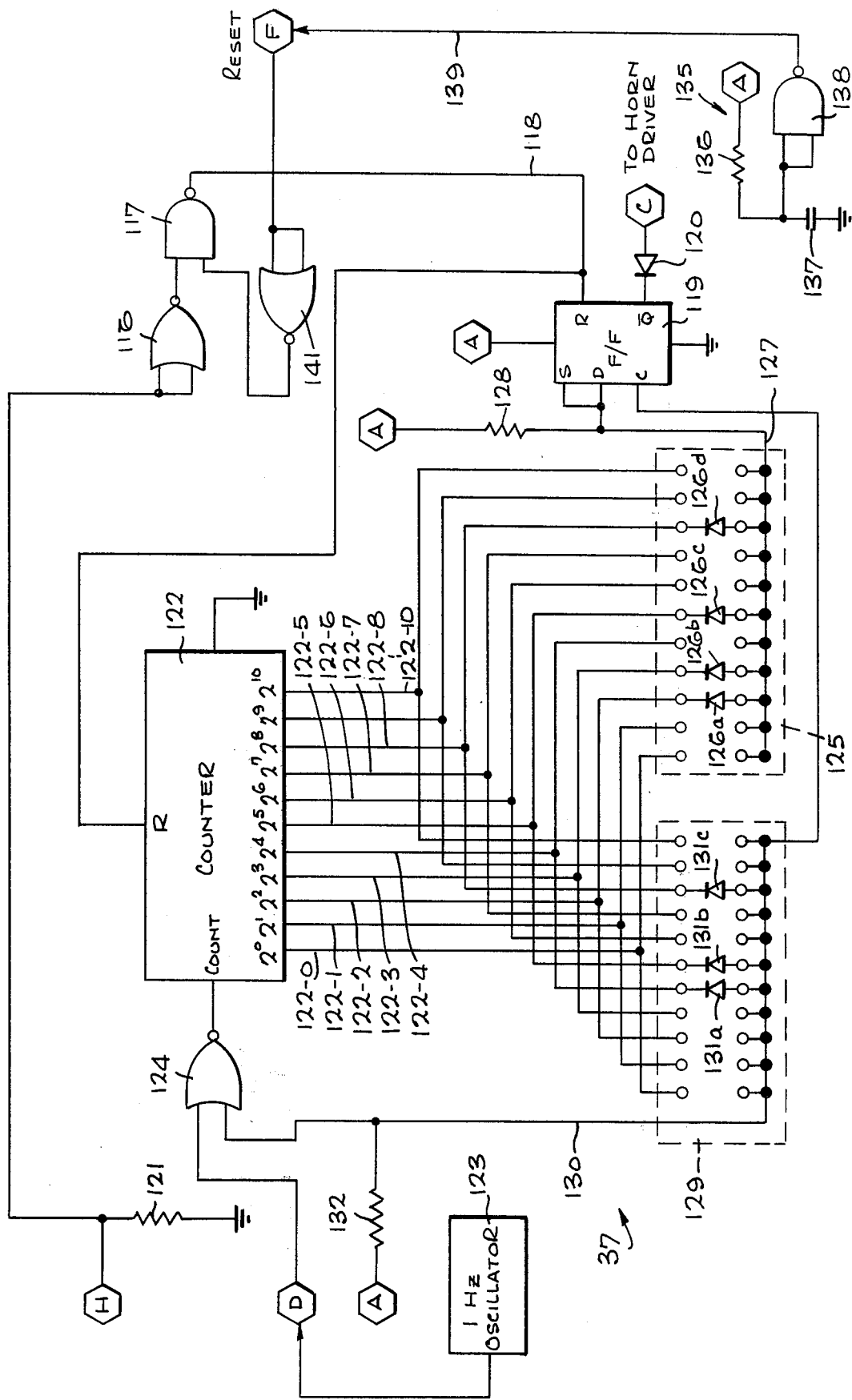

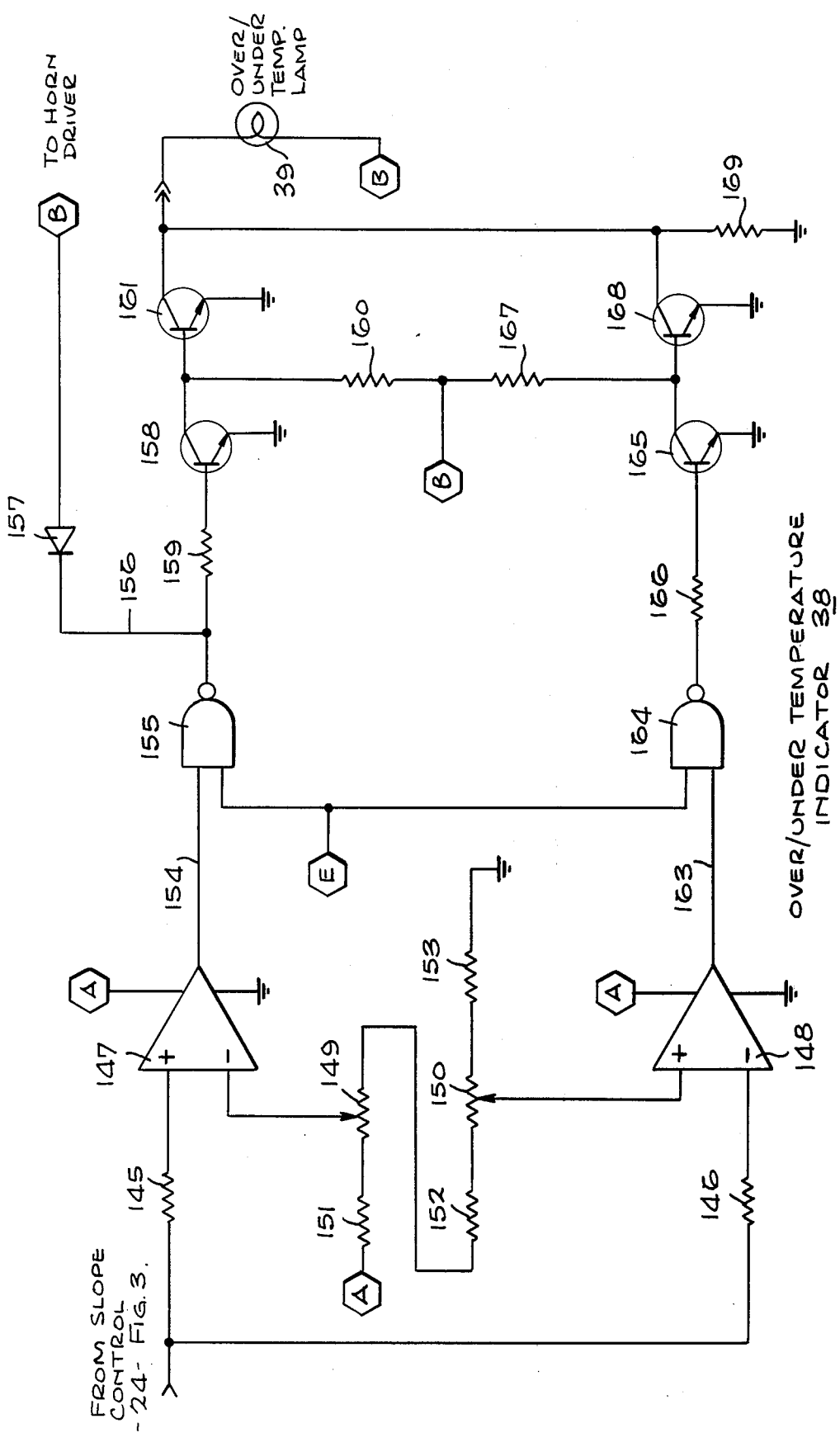

COOKING TIME CONTROL SYSTEM

This is a continuation application of Ser. No. 732,214, filed Oct. 14, 1976, now abandoned which is a continuation of Ser. No. 627,089, 10-30-75, abandoned.

BACKGROUND OF THE INVENTION

1. Field of the Invention

The present invention relates to a cooking time control system and specifically to such a system wherein a pulse train is generated having a pulse rate proportional to the cooking rate of a certain food at the temperature of the medium in which cooking is taking place, and wherein complete cooking is detected by counting a preset number of such pulses.

2. Description of the Prior Art

Two favorite items in fast food chain restaurants are french fried potatoes and fruit turnovers. These foods are cooked in deep fat fryers, generally by placing them in a basket that is lowered into the hot fat. When cooking is complete, the basket is removed and the food either packaged immediately for sale, or placed in a holding area that is warmed by a heat source such as an infrared lamp.

Typical commercial deep fat fryers include thermostatically controlled heaters that maintain the fat or cooking oil at a nominal temperature, typically 350° F. A timer may be used to control the length of time that the food is cooked, typically 2½ minutes for french fries and 8 to 10 minutes for turnovers. A clock timer may be used for this purpose. However, this is not preferred because the time required to achieve a particular degree of crispness will very significantly with changes in the temperature of the fat during the cooking cycle. This in turn will depend on numerous factors including, among others, (1) how many potatoes or turnovers are in the basket, (2) the temperature of the food when it is first immersed in the fat, (3) whether other baskets of food are placed in the same fryer while the first batch is still cooking, (4) the initial moisture content of the food, and (5) the speed and lack of over shoot with which the heating system can bring the temperature of the fat back up to its nominal value.

By way of example, a typical commercial fryer may hold three baskets. If only one basket is placed in the hot fat, with only a few potatoes, the temperature of the oil will drop slightly and recover rapidly. However, if there are many potatoes in the basket it will take a longer time for the temperature to come back up to its nominal value.

The initial temperature and moisture content of the potatoes also will effect both how low the fat temperature will drop when the basket is inserted, and how long the temperature will remain depressed. If the potatoes are not dehydrated, but have a high water content, considerable heat energy will be expended to boil off this water, thereby keeping the fat temperature depressed for a longer period of time. If another basket of potatoes or turnovers is inserted into the fat while the first batch is frying, the temperature also will be depressed, and the same considerations will apply as to the amount and duration of temperature reduction.

The rate at which the temperature comes back up to its nominal value will depend on the characteristics of the heater and its control circuitry. In many systems the temperature may recover quickly, but then overshoot so that the fat will go to a temperature higher than the nominal value, followed by a gradual decline back to that desired temperature. All of these factors will influence the length of time that it takes to cook french fries or turnovers of desired crispness, and emphasize the fact that merely measuring the elapsed time of immersion of the food in the hot fat is not satisfctory to determine when cooking is complete.

In an attempt to overcome this problem, prior art cooking time controllers have employed temperature sensors and circuitry to adjust the cooking time dynamically to these temperature changes. However, certain shortcomings are inherent in all of these systems. Most notably, resistive temperature sensors have been used in conjunction with analog timing circuitry in which a timing capacitor was charged through a circuit dependent on the sensor resistance. This type of circuitry is not accurate for measuring a long time period, such as the 8 to 10 minutes required to cook turnovers. Even at 2½ minutes, the typical frying time for potatoes, inaccuracy results.

Another shortcoming of prior art cooking control systems results from the change in cooking rate at different temperatures. Over large temperature ranges, the cooking rate may vary as the fourth power of temperature. Thus for deep fat frying, when the temperature is high, the cooking time is short. As the temperature decreases toward the boiling point of water, the cooking time gets extremely long. In the relatively restricted temperature range of from about 275° F. to about 375° F. in which deep fat frying generally is carried out, the cooking rate as a function of temperature curve can be reasonably approximated as a straight line function. However, the slope of this cooking rate vs. temperature curve usually is different from the slope of the resistance vs. temperature curve of typical resistance transducers. Thus in prior art systems which corrected the cooking time as a direct function of temperature change as sensed by a resistance probe, an error resulted because this did not compensate for change in cooking rate.

Accordingly, it is another object of the present invention to provide a cooking time control system that does compensate for changes in cooking rate as a function of temperature.

The temperature sensors used in most prior art cooking time control systems had the additional problem of being nonuniform. That is, individual sensors exhibited different change in resistance as a function of temperature. Two individual sensors, although of the same nominal specification, might exhibit different absolute resistances at a particular temperature. This compounded the problems discussed above, and led to considerable differences in corrected cooking time from system to system, for the same set of temperature change parameters of the cooking medium. To compensate for this, prior art systems were provided with an externally operated vernier time control, typically called a "crispness control". This permitted the individual restaurant operator to adjust the unit to produce a particular degree of crispness. While such control seems desirable, the actual effect may be detrimental, particularly where uniformity of product is sought. Thus one operator may set the control for a particular crispness and later a different operator may select another crispness value. This is particularly unadvantageous in fast food chain restaurants where uniformity of taste and product quality is desired in all of the chain's restaurants.

Another object of the present invention is to provide a cooking time control system which uses a platinum resistance temperature transducer, the performance of which is very uniform from device to device. A further object of the present invention is to provide a control system using such a transducer in conjunction with circuitry that results in a uniform degree of cooking without the use of an external crispness control or other vernier adjustment of the timing circuitry.

A further shortcoming of prior art control systems resulted from the use of resistance temperature sensors that exhibited a negative temperature coefficient in which the resistance decreases with increasing temperature. If such a probe should fail, an infinitely high resistance resulted. This was interpreted by the associated circuitry as being an excessively low temperature, whereas in fact the failure might have been caused by an extreme overtemperature such as when the fat came close to the flash temperature. In contrast, it is an object of the present invention to employ a positive temperature coefficient sensor. Used in conjunction with an over-temperature indicator, failure of such a transducer will be indicated as an excessive temperature condition in the cooking medium. Improved safety results.

Another object of the present invention is to provide a control system having a holding timer, started when cooking is complete and the basket is removed from the fat, for indicating how long the cooked food can be maintained in a holding area. In the case of french fries, these typically can be held for 5 to 10 minutes after they are cooked. Thereafter, they are considered no longer saleable. The holding timer gives restaurant personnel a visual or aural notification that any potatoes remaining in the holding area should be disposed of.

A further object of the invention is to allow the cooking of various items with widely varying cooking times without the use of more probes to accomplish it.

SUMMARY OF THE INVENTION

These and other objectives are achieved by providing a cooking time control system using a platinum resistance temperature transducer to sense the temperature of the hot fat or other cooking medium. The transducer is connected in the feedback circuit of an operational amplifier so as to produce an output voltage that is linearly related to the sensed temperature. This voltage in turn is supplied to a slope control circuit in which the relationship of voltage as a function of temperature is modified to correspond to the change in cooking rate of the food as a function of temperature.

The resultant voltage, which is indicative of the cooking rate at the present temperature of the cooking medium, is used to control the frequency of a voltage controlled oscillator. The oscillator output comprises a pulse train having a pulse repetition rate indicative of the cooking rate. Thus the oscillator produces "cooking rate pulses".

When cooking begins, a start switch is depressed that causes a counter to count the cooking rate pulses. A "cooking complete" count detector determines when a certain preset number of such pulses have been counted, and in response to this condition produces a "DONE" signal. The signal turns on an indicator to show that cooking is complete.

BRIEF DESCRIPTION OF THE DRAWINGS

A detailed description of the invention will be made with reference to the accompanying drawings wherein like numerals designate corresonding parts in the several figures.

FIG. 4 is an electrical schematic diagram of the counter, count control circuitry and "cooking complete" count detector components of the inventive system.

FIG. 5 is an electronic schematic diagram of the holding timer used in the system of FIG. 2.

FIG. 6 is an electronic schematic diagram of the over/under temperature indicator used in the system of FIG. 2.

FIG. 7 is an electrical schematic diagram of the horn driver used in the system of FIG. 2.

DESCRIPTION OF THE PREFERRED EMBODIMENT

Figure 1:
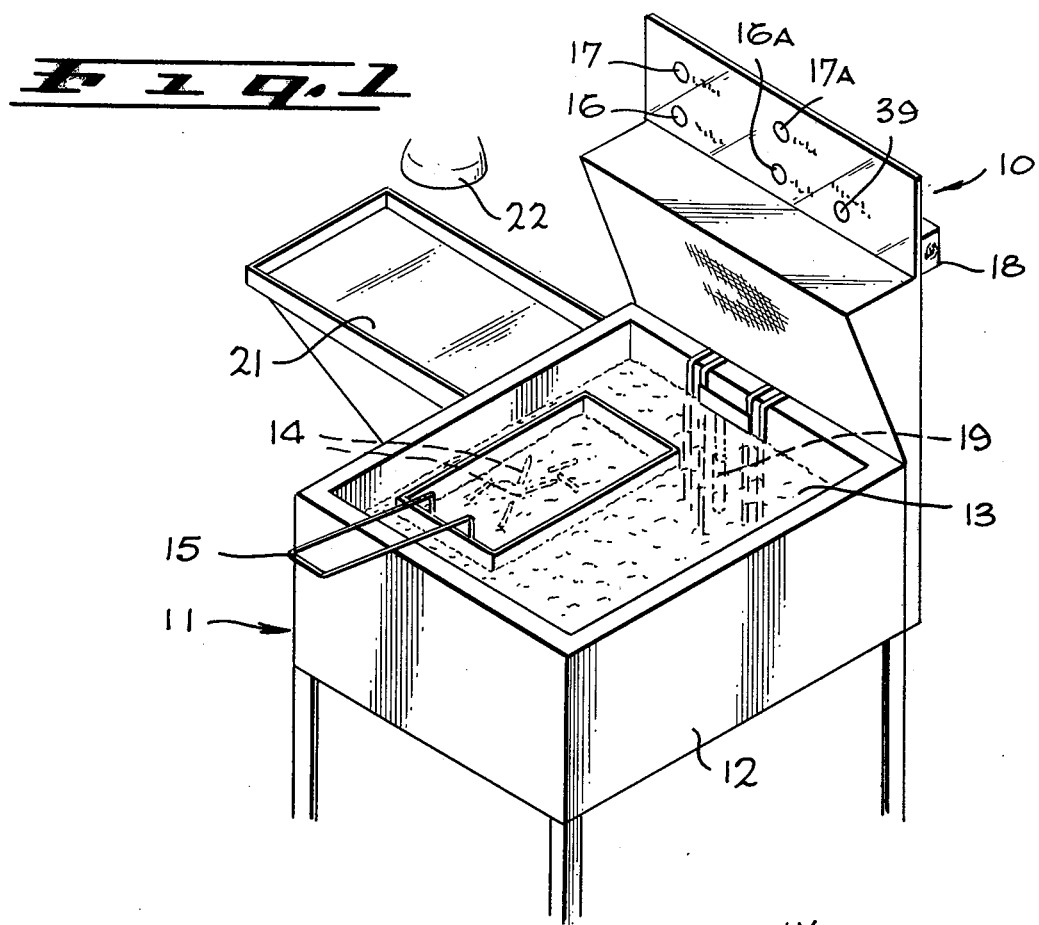
FIG. 1 is a pictorial view of a deep fat fryer utilizing the inventive cooking time control system.

The following detailed description is of the best presently contemplated modes of carrying out the invention. This description is not to be taken in a limiting sense, but is made merely for the purpose of illustrating the general principles of the invention since the scope of the invention best is defined by the appended claims.

The invention cooking time control system 10 advantageously is employed with a deep fat fryer 11 commonly used to cook french fried potatoes, apple turnovers, or other food commodities. The fryer 11 includes a vat 12 that is filed with cooking oil, fat or other cooking medium 13. A thermostatically controlled heater (not shown ) heats the fat 13 to a nominal cooking temperature on the order of 350° F.

The food commodity to be cooked, such as potatoes 14, are held in a basket 15 that is immersed in the fat 13. To utilize the inventive cooking time control system 10, a start pushbutton 16 is depressed when the basket 15 is placed into the vat 12. This will cause a lamp 17 to go on, and will begin the timing cycle. When cooking is complete, the lamp 17 will start to flash, and a horn 18 will sound in a pulsed manner. The cooking time is not a constant, but will vary dynamically in response to the actual temperature variations of the hot fat 13, as measured by a resistance temperature probe 19 immersed therein, and compensated for cooking rate changes.

When cooking is complete, the basket 15 is removed from the vat 12 and the potatoes 14 are placed in a holding area 21 where they are warmed by a heat lamp 22. The control system 10 includes a holding timer that begins a timing cycle when cooking is complete, and which sounds the horn 18 at the end of a time period corresponding to the maximum acceptable duration of time that the potatoes 14 can be held in the holding area 21.

Figure 2:
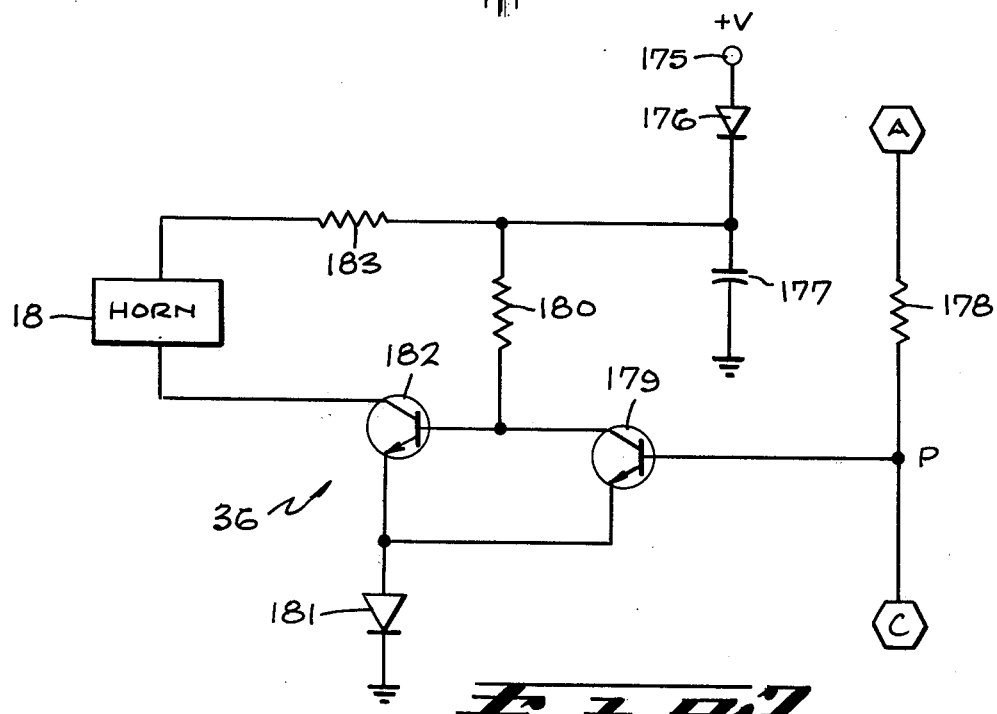
FIG. 2 is an electrical block diagram of the cooking time control system.
Figure 2:
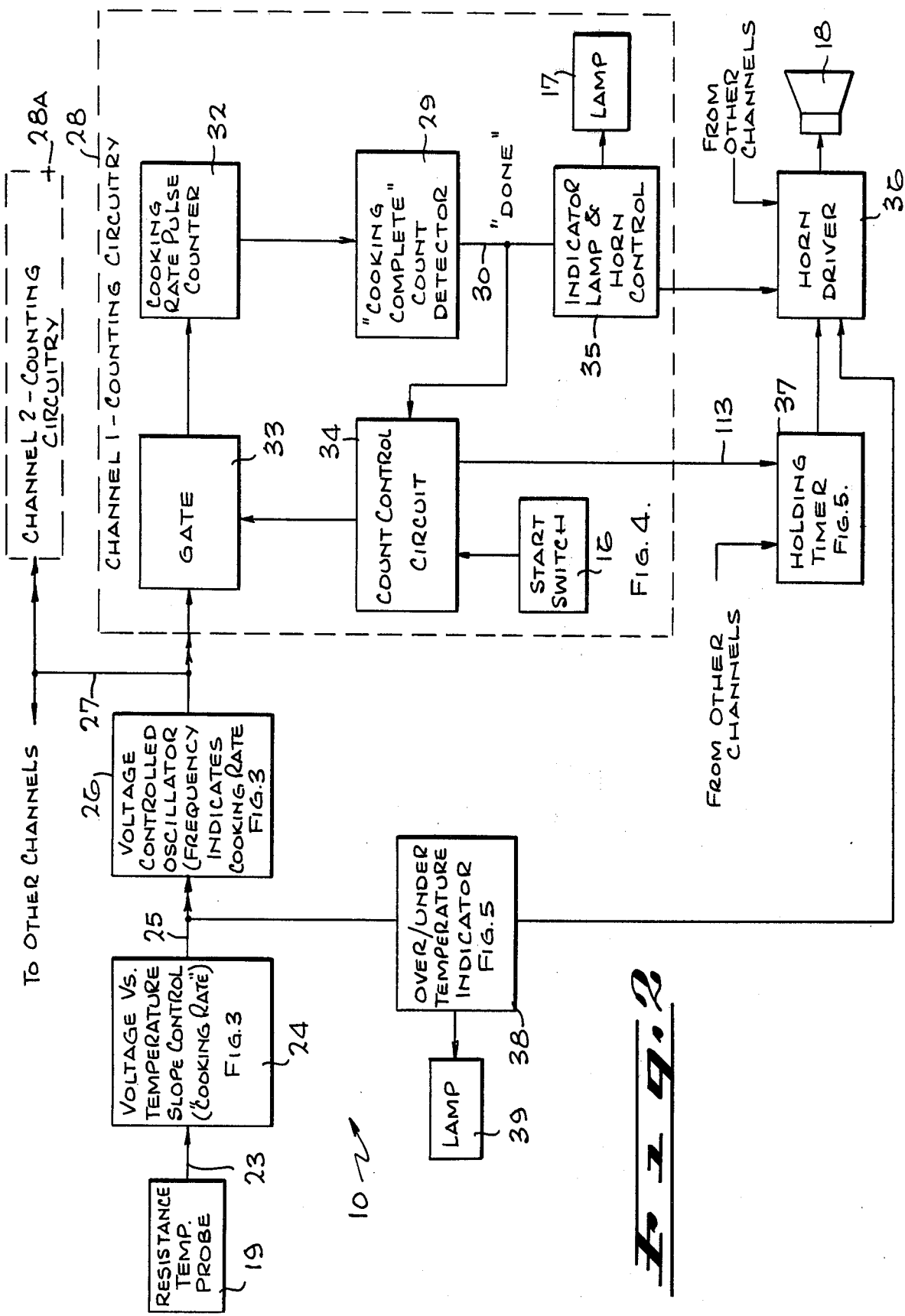

A block diagram of the inventive cooking time control system 10 is shown in FIG. 2. Referring thereto, the resistance temperature probe 19 and its associated circuitry (FIG. 3) provide on a line 23 a voltage that is proportional to the temperature of the fat 13 in the vat 12. Advantageously, the probe 19 is a platinum resistance device which has a positive temperature coefficient, and which offers close tolerance and reproducible sensitivity, particularly in the temperature range around 350° F.

A circuit 24 is used to modify the slope of the voltage versus temperature signal received from the probe 19 so as to provide on a line 25 a signal that more accurately reflects the change in cooking rate as a function of temperature. This signal is used to control the frequency of a voltage controlled oscillator 26. The output of the oscillator 26 thus is a pulse train having a frequency that is indicative of the cooking rate at the temperature of the fat 13.

The "cooking rate" pulse train from the oscillator 26 is supplied via a buss 27 to separate "cooking complete" counting circuitry 28 associated with each channel or basket position in the vat 12. This circuitry begins counting the cooking rate pulses on the line 27 when the start switch 16 is depressed. When a preset count is reached, a "cooking complete" count detector 29 produces a "DONE" signal on a line 30. This signal causes the lamp 17 to flash and the horn 18 to pulse, indicating that cooking is complete. The cooking time duration is not a constant. Since the temperature of the fat 13 will vary, the frequency of the cooking rate pulses on the line 27 likewise will vary. However, the relationship of this frequency to the sensed temperature is such that a fixed number of cooking rate pulses always will indicate that the food is done. For example, if during cooking of the potatoes 14 in the basket 15 (FIG. 1) another basket of potatoes is placed in the vat 12, the fat 13 will drop in temperature for some while. During this time, the frequency of the pulses on the line 27 will drop, indicative of the slower cooking rate while the fat temperature is low. Thus it will take a longer time duration for the preset number of pulses to occur and for the count detector 29 to produce the "DONE" pulse. It is in this manner that the cooking time control system 10 compensates for temperature changes in the cooking medium.

The circuitry 28 includes a pulse counter 32 which is reset to zero before each cooking cycle, and which counts the cooking rate pulses supplied from the line 27 via a gate 33. A count control circuit 34 enables the gate 33 when the start switch 16 is depressed, and maintains the gate 33 in the enabled state until occurrence of the "DONE" pulse on the line 30. The count detector 29 itself is responsive to the contents of the pulse counter 32 and thus produces the "DONE" signal when the counter 32 reaches the preset value which indicates that cooking is complete. The "DONE" signal also actuates certain indicator control circuitry 35 that causes the lamp 17 to flash and the horn 16 to pulse.

Each separate basket in the fryer 11 has separate counting circuitry identical to the circuitry 28. Thus in FIG. 1 the fryer 11 has a second start switch 16A and lamp 17A, together with a second channel containing complete counting circuitry 28A. The horn 18, its associated horn driver 36 and the holding timer 37 are shared by all of the channels.

Also shared by all channels is the single resistance temperature probe 19 and the associated slope control 24 and voltage controlled oscillator 26. Since the temperature of the fat 13 is substantially uniform throughout the vat 12, the cooking rate pulses on the line 27 are equally applicable to control all of the baskets in the vat 12. This is true even though different food items may be frying in the same vat 12. For example, one basket may contain potatoes and another contain turnovers. Perfect cooking times are achieved for both by appropriately presetting the corresponding detectors 29 to sense different counts associated respectively with the complete cooking of potatoes and turnovers. Of course, the optimum voltage versus temperature slope set by the control circuit 24, and the specific preset count values sensed by the detector 29 are empirically determined to achieve the best tasting cooked food product. Once determined, however, consistent, perfect cooking is achieved every time the system 10 is used.

The system 10 also includes an over/under temperature detector 38 responsive to the signal on the line 25. This detector 38 sounds the horn 18 and and/or flashes a lamp 39 if the temperature of the fat 13 exceeds or is below certain acceptable limits. An advantage of using a platinum resistance temperature probe 19 is that in the event of probe failure, a very high temperature will be indicated, horn beeps and the lamp 39 will flash, and if cooking is attempted, the oscillator 26 output frequency will be at a maximum so that the "DONE" signal will occur rapidly. This prevents the excessive heating and potential fire hazard that might occur if probe failure were to indicate a low temperature and cause extremely low frequency output from the oscillator 26.

Figure 3:
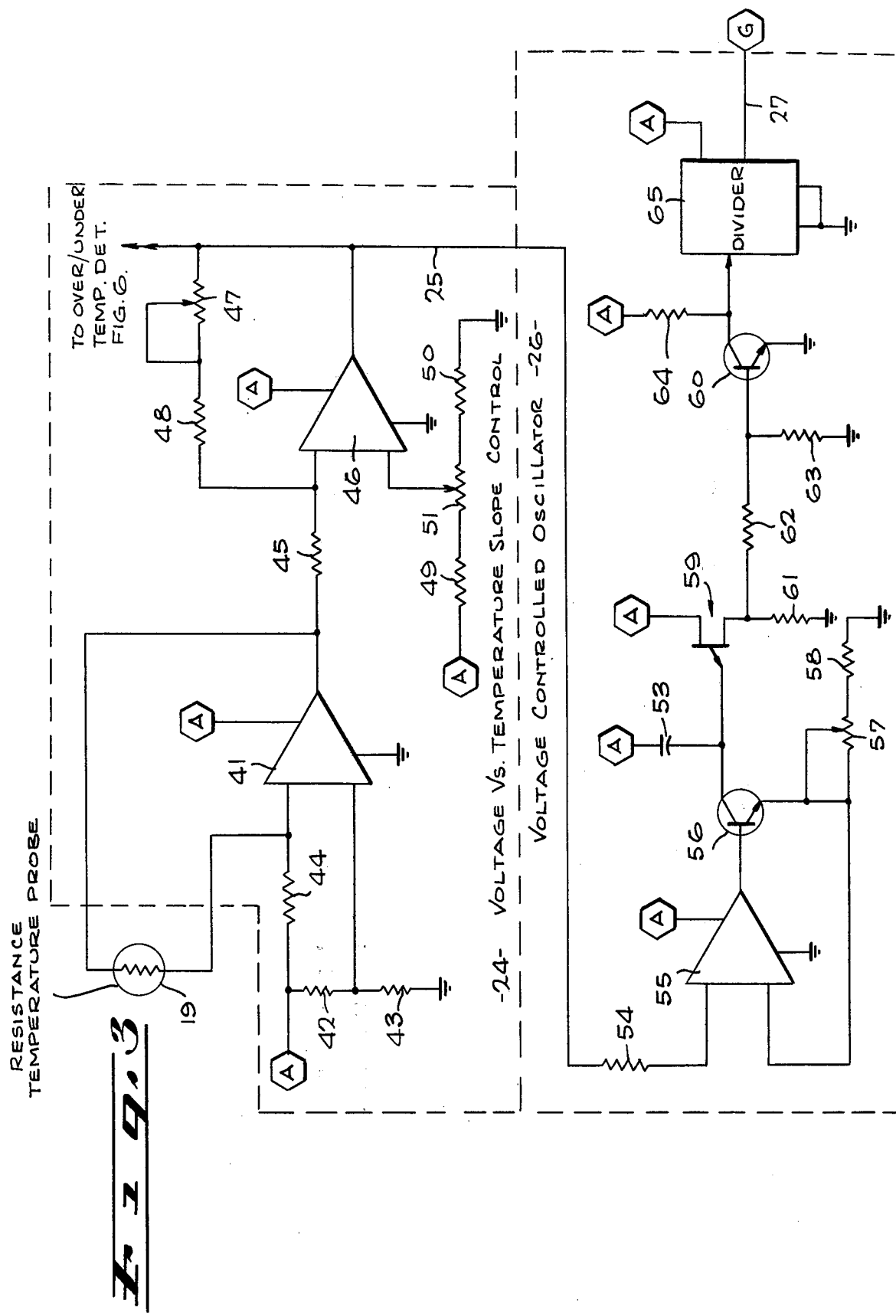
FIG. 3 is an electrical schematic diagram of the temperature probe, voltage versus temperature slope control circuit and voltage controlled oscillator components of the system of FIG. 2.

Referring now to the schematic diagram of FIG. 3, the control system 10 circuitry is powered by conventional dc power supplies (not shown) that provide a positive dc voltage, typically +13 volts, to the terminals marked A and a slightly higher positive dc voltage, typically +24 volts, to the terminals marked B. The dc return is to ground.

In the slope control circuit 24, the resistance temperature probe 19 is connected in the feedback path of an operational amplifier 41 that receives a fixed voltage at its reference terminal from a divider consisting of resistors 42 and 43. A bias voltage is provided to the same amplifier 41 input terminal as the probe 19 via a resistor 44. With this feedback arrangement, the output of the amplifier 41 is a voltage that is linearly related to the temperature sensed by the probe 19. With a platinum resistance probe, this voltage increases with rising temperature. The output voltage from the amplifier 41 is supplied via a resistor 45 to one input terminal of another operational amplifier 46 connected to provide control of the voltage versus temperature slope. To this end, a potentiometer 47 and a resistor 48 are series connected in the feedback path from the output of the amplifier 46 to the same input terminal as the temperature-indicating voltage from the amplifier 41. Adjustment of the potentiometer 41 controls the amount of feedback and hence controls the slope of the voltage obtained at the output terminal 35 as a function of temperature. An adjustable voltage is provided to the reference terminal of the amplifier 46 by a voltage divider consisting of fixed resistors 49 and 50 and a potentiometer 41. Adjustment of the potentiometer 51 changes the zero intercept of the signal on the line 25. In other words, the setting of the potentiometer 51 estabishes the temperature at which the signal on the line 21 is zero, and the setting of the potentiometer 47 determines how much this voltage on the line 25 will increase per degree as the temperature rises above that value at which zero voltage is obtained. Advantageously, the potentiometers 47 and 51 are set so the voltage on line 25 will conform to the cooking rate as a function temperature.

In thew voltage controlled oscillator 26 (FIG. 3), the voltage on the line 25 is used to control the charging current to a capacitor 53. To this end, the line 25 is connected via a resistor 54 to an operational amplifier 55 the output of which controls conduction of a transistor 56. Current flow to the capacitor 53 is via the transistor 56, a potentiometer 57 and a resistor 58. As the voltage on the line 25 increases, the conduction of the transistor 56 likewise increases to provide more current to the capacitor 53, resulting in a faster charging time.

When the charge on the capacitor 53 reaches a certain level, it causes conduction of a complimentary unijunction transistor 59. This discharges the capacitor 53 and provides a pulse to a transistor 60 via a network of resistors 61–63. The collector of the transistor 60 is connected to the positive voltage source via a resistor 64 and also is connected to the input terminal of a divider circuit 65. Thus each time the capacitor 53 is discharged, a pulse is provided to the divider 65. Of course, as soon as the capacitor 53 is discharged, it begins to charge again at a rate determined on the line 25. Accordingly, consecutive pulses are produced at the input to the divider 65 at a rate controlled by the voltage on the line 25. Typically the values of the capacitor 53 and the resistors 57 and 58 are selected so that the oscillation frequency at the input to the divider 65 is on the order of 1 kHz. The divider 65 then typically may be implemented by a type 4040 ripple counter that divides by $2^{12}=1024$. The output of the divider 65 supplies the cooking rate pulses to the line 27. With the typical values given, the output frequency on the line 27 will be a nominal 1 Hz at the nominal cooking temperature of say 350° F. When the temperature in the vat 12 varies above or below this nominal value, the voltage on the line 25, and hence the frequency of the oscillator 26 will change correspondingly, and the cooking rate pulse train on the line 27 will go above or below the nominal 1 Hz as the temperature changes.

As shown in FIG. 4, the cooking rate pulses on line 27 are supplied to one of three inputs to a NAND-gate 33' the output of which is connected to the counter 32. Advantageously the counter 32 also is a type 4040 ripple counter that has separate outputs 32-0 through 32-9 for the corresponding binary bit positions $2^0$ and $2^9$.

The count control circuit 34 includes a flip-flop 69 that initially is reset to the $\overline{Q}$ state. The resultant high signal on the $\overline{Q}$ output line 70 resets the counter 32 to zero. In this state, all of the outputs 32-0 through 32-9 are low so that the count detector 29 produces a low signal on the line 30. This in turn is inverted by a NAND-gate 71 to provide a high signal via a line 72 to the second input of the gate 33'. However, the gate 33' is not yet enabled, since its third input is supplied via a line 73 from the Q output of the flip-flop 69, which initially is low. Since the gate 33' is disabled, no pulses from the line 27 reach the counter 32 and that counter remains in its zero state.

When the start switch 16 is closed, a trigger signal is provided that sets the flip-flop 69 to the Q state. As a result, the signal on the line 73 goes high to enable the gate 33'. The cooking rate pulses from the line 27 now pass through the gate 33' to increment the counter 32.

The count detector 29 consists of a set of diodes 74 connected between selected output terminals of the counter 32 and the line 30. The line 30 also is connected to the positive source A via a resistor 75.

The preset "cooking complete" count is entered into the count detector 29 through use of appropriate diodes 74. For example, if the nominal pulse rate on the line 27 is 1 Hz, and the nominal desired cooking time is $2\frac{1}{2}$ minutes (150 seconds), the desired count is 150. Accordingly, four diodes, 74a, 74b, 74c and 74d are connected between the line 30 and the respective terminals 32-1, 32-2, 32-4 and 32-7 corresponding to binary counts 2, 4, 16 and 128. When the counter 32 reaches a count of 150 (base 10), all of these four terminals will have high outputs. As a result, a high output (i.e., the "DONE" signal) will be produced on the line 30.

When the gate 33' is enabled following closure of the start switch 16, the counter 32 starts to count pulses from the line 27. Before 150 such pulses have been received, at least one of the terminals 32-1, 32-2, 32-4 and 32-7 always is low, so that the signal on the line 30 remains low. When a count of 150 is reached, all of these terminals go high so as to produce the "DONE" signal. This high signal on the line 30 is inverted by the NAND-gate 71 so that the signal on the line 72 goes low. This disables the gate 33' and terminates the counting operation.

The "DONE" signal also is supplied to the indicator control circuit 35 to cause flashing of the lamp 17 at a rate corresponding to a control pulse signal supplied to the terminal E from a square wave oscillator 76 or other source. The control signal typically may comprise a square wave that is on for one-half second and off for one-half second, so that the lamp 17 will flash and the horn 18 will sound at a 1 Hz repetition rate.

To this end, the "DONE" signal on the line 30 is used to enable an NAND-gate 77 that receives the control signal from the terminal E and provides this signal via a diode 78, a line 79 and a terminal C to the horn driver 36.

While the flip-flop 69 remains in the Q state, the control pulses supplied via the NAND-gate 77 also are passed via a NAND-gate 80, enabled by the high Q signal on the line 73, and a resistor 81 to the base of a transistor 82. The transistor 82 is connected to the positive voltage source B via a resistor 83 and to the base of another transistor 84 that gates power to the lamp 17. A resistor 85 shunts the lamp 17. With this arrangement, the transistors 82 and 84 and the lamp 17 are turned on in unison with the control pulse from the terminal E so as to flash the lamp 17 at a rate determined by the control signal source such as the oscillator 76. The lamp flashing begins when the "DONE" signal is detected and continues until the flip-flop 69 is reset.

The lamp 17 will continue to flash and the horn 18 will continue to pulse until the start switch 16 again is depressed. Such switch closure causes the flip-flop 69 to toggle back to the $\overline{Q}$ state, so that the Q output on the line 73 goes low. This disables the NAND-gate 80 to turn off the lamp 17. The $\overline{Q}$ output of the flip-flop 69 is connected to the reset (R) terminal of the counter 32, so that when the flip-flop 69 toggles to the $\overline{Q}$ state, the high signal on the line 70 resets the counter 32 to zero. As a result, the line 30 goes low, terminating the "DONE" signal. This disables the NAND-gate 77, thereby terminating the signal on the line 79 and turning off the horn 18. The channel 28 now is in the reset state, so that a new counting cycle will be initiated the next time the start button 16 is closed.

Toggling of the flip-flop 69 is facilitated by connecting the $\overline{Q}$ output line 70 back to the data (D) input of the flip-flop, and by providing a pulse to the clock (C) input of the flip-flop 69 each time the start switch 16 is closed. With this arrangement, a high input to the clock (C) terminal causes the flip-flop to assume the state specified by the signal provided to the data (D) terminal. If the flip-flop was in the $\overline{Q}$ state, the D input will be high, so as to cause the flip-flop 69 to switch to the Q state upon occurrence of a high signal at the C input. When in the Q state, the signal on the line 70 is low so that the data (D) input is low. Accordingly, occurrence of the next high C input will cause the flip-flop 69 to revert back to the $\bar{Q}$ state.

The count control circuit 34 includes circuitry to prevent accidental or premature toggling of the flip-flop 69. Thus, once the flip-flop 69 has been set to the Q state to begin the counting cycle, it cannot be toggled back to the $\bar{Q}$ state until the count is complete and the "DONE" signal occurs. To this end, the $\bar{Q}$ output on the line 70 and the count detector 29 output on the line 30 provides the two inputs to a NOR-gate 89. During the count cycle, before the "cooking complete" count has been sensed by the detector 29, both of these inputs will be low so that the NOR-gate 89 will provide a high signal on a line 90. This signal disables a NOR-gate 91 in the input circuit to the clock (C) terminal of the flip-flop 69. By so disabling the NOR-gate 91, no trigger pulse can reach the clock (C) input, and hence the flip-flop 69 cannot be toggled during the counting cycle. When cooking is complete and the "DONE" signal on the line 30 goes high, the output from the NOR-gate 89 goes low, thereby enabling the NOR-gate 91 so that the flip-flop 69 can be toggled by subsequent closure of the start switch 16 to turn off the lamp 17 and the horn 18 as described above.

If abort cycle ability is required, then a switch 92 is transferred from its normal position in contact with the terminal 92a into contact with the terminal 92b. This disconnects the output of the NOR-gate 89 from the line 90, and connects that line to ground. As a result, the NOR-gate 91 stays enabled so that closure of the start switch 16 during the count cycle will toggle the flip-flop 69 to the $\bar{Q}$ state, thereby aborting the counting cycle prior to occurrence of the "DONE" signal.

Accidental toggling of the flip-flop 69 because of contact bounce in the switch 16 is prevented by the circuit 87. This circuit requires that the switch 16 stay closed for a period of time determined by a capacitor 95 and a resistor 96 before a trigger pulse is provided to the flip-flop 69. To this end, the switch 16 is connected in series to a resistor 97 between the positive voltage terminal A and ground. The switch 16 also is connected to a NAND-gate 98 that functions as an inverter. When the switch 16 is closed, the output of the NAND-gate 98 goes low, to initiate charging of the capacitor 95. Eventually the charge on the capacitor 95 gets sufficiently large so as to enable a NAND-gate 99 the second input of which is connected directly to the switch 16. Thus only if the switch 16 is still depressed at the end of the charging time of the capacitor 95 will both inputs to the NAND-gate 99 be high so as to produce a low output on a line 100. If contact bounce should occur at the switch 16, charging of the capacitor 95 may be intermittent as the bouncing contact is made and broken. However, no corresponding, undesirable series of pulses will be produced on the line 100. Rather, only a single pulse 100 will occur if the switch 16 still is closed at the end of the charging time.

The timed feedback circuit 88 prevents rapid retoggling of the flip-flop 69 after it has been reset to the $\bar{Q}$ state at the end of the count cycle. When this occurs, the line 70 goes high so as to disable a NOR-gate 102 that receives the signal on the line 100 as its second input. However, the high signal on the line 70 begins to charge a pair of capacitors 103, 104 via a current path including a resistor 105. The junction of the capacitor 103 and the resistor 105 is connected to the NOR-gate 102 via a resistor 106. Thus as the capacitors 103, 104 are charged, the level of the signal supplied via the resistor 106 to the NOR-gate 102 decreases. Eventually this level will drop sufficiently so as to enable the NOR-gate 102. However while disabled, the trigger pulse on the line 100 caused by closure of the switch 16 will not pass through the NOR-gate 102, so that the flip-flop 69 cannot be toggled during this delay period.

At the end of the delay period the NOR-gate 102 again is enabled. Under this condition, when the switch 16 is closed the resultant low signal on the line 100 appears as a high signal on an output line 107 from the NOR-gate 102. This signal is shaped by a pulse shaper comprising a NOR-gate 108, a pair of capacitors 109 and 110, and a resistor 111. The shaped pulse is provided as the second input to the NOR-gate 91. When this NOR-gate 91 is enabled, the pulse is transmitted through to the clock (C) input so as to toggle the flip-flop 69.

When cooking is completed, the basket 15 (FIG. 1) is removed from the vat 12 and the start button 16 is depressed as described above to turn off the light 17 and the horn 18. When this occurs, a signal also is provided on a line 113 and a terminal H to initiate operation of the holding timer 37. This signal is supplied via a diode 114 from the Q output line 73 which goes high when the flip-flop 69 is toggled by closure of the switch 16 after the end of the counting cycle.

As described above, a single holding timer 37 is used for all channels. The lines 113 from all of the channels are connected to the common terminal H (FIG. 5). This terminal H is connected directly to the input of a NOR-gate 116 and via a resistor 121 to ground. With this arrangement, as soon as the flip-flop 69 in all connected channels are toggled to the $\bar{Q}$ state by closure of the start switch 16 subsequent to completion of cooking, the output of the NOR-gate 116 will go from low to high. This output is inverted by a NAND-gate 117 to provide a low signal on a line 118 that starts the holding timer 37 counting cycle.

To this end, the high signal on the line 118 resets a flip-flop 119 to the $\bar{Q}$ state. The $\bar{Q}$ output is connected via a diode 120 and the terminal C to the horn driver 36. The horn is held off, since it only will sound when the horn driver input C goes low. The signal on the line 118 also resets a counter 122 to zero.

Timing is accomplished by using the counter 122 to count 1 second pulses supplied from a 1 Hz source such as an oscillator 123 connected to the terminal D. These clock pulses are supplied to the counter 122 via a NOR-gate 124 that is enabled during the counting operation.

The desired holding time is preset into the timer 37 by appropriate diode connections in a count detector 125. For example, if a five minute (300 second) holding time is desired, diodes 126a, 126b, 126c and 126d are connected from a common output line 127 to the respective counter terminals 122-2, 122-3, 122-5 and 122-8 that correspond to binary outputs of $2^2$, $2^3$, $2^5$ and $2^8$. The line 127 is connected to the positive voltage terminal A via a resistor 128. Prior to reaching a count of 300 (base 10), at least one of the counter 122 terminals to which the diodes 126 are connected will be low. Thus the line 127 will be held low. When the counter 122 reaches 300, all of the terminals 122-2, 122-3, 122-5 and 122-8 will go high so that a high signal will occur on the line 127. This occurs 300 seconds (5 minutes) after the count was started. The high signal on the line 127 is supplied to the set (S) input of the flip-flop 119, and so switches that device to the Q state. As a result, the $\overline{Q}$ output goes low, and this low signal supplied via the diode 120 to the horn driver 36 causes the horn to sound, giving notice that the holding period is over and that any food remaining in the holding area 21 should be thrown out.

The duration that the horn 18 stays on also is established by the counter 122 in conjunction with another count detector 129 that has an output line 130 connected to the second input to the NOR-gate 124. The diodes 131 in the detector 129 define a count equal to the holding time plus the time duration that the horn 18 is to sound. For example, if the holding time is five minutes (300 seconds) and the horn is to sound for four seconds, the circuit 129 is set to detect a count of 304 (base 10). To this end, diodes 131a, 131b and 131c are connected respectively to the counter terminals 122-4 ($2^4$), 122-5 ($2^5$) and 122-8 ($2^8$). The line 130 also is connected to the positive voltage terminal A via a resistor 132.

Before a count of 304 (base 10) is reached, at least one of the terminals 122-4, 122-5 and 122-8 is low so that the line 130 is held low. This enables the NOR-gate 122 to pass the 1 second timing pulses from the source 123 to the counter 122. When the count of 304 is reached, the line 130 goes high. This inhibits the NOR-gate 124 to terminate counting by the counter 122. Further, the high signal on the line 130 is supplied to the clock (C) input to the flip-flop 119. Since at this time the signal on the line 127 is low, and hence the data (D) input is low, the flip-flop 119 will toggle back to the Q state. The $\overline{Q}$ output goes high, and this high signal connected to the horn driver 36 via the diode 120 causes the horn 18 to turn off.

To insure that the various system flip-flops initially are set to the correct state when the power first is turned on to the system 10 a reset circuit 135 (FIG. 5) to used. This circuit includes a resistor 136 and a capacitor 137 connected in series between the positive voltage terminal A and ground. The junction of these two components is connected to both inputs of a NAND-gate 138 the output of which is connected via a line 139 to the reset terminal F.

When power is first turned on, the input to the NAND-gate 138 is low so that a high reset signal is provided on the line 139. Thereafter, the capacitor 137 charges up to a sufficiently high level so s to cause the output from the NAND-gate 138 to remain low as long as the power remains on. Another high reset signal on the line 139 will not occur until the power is turned off and then subsequently turned on again.

The initial reset pulse on the line 139 is used to set the flip-flop 119 (FIG. 5) to the $\overline{Q}$ state. To this end, it is supplied via a NOR-gate 141 to the second input of the NAND-gate 117. Thus when the power first is turned on the NOR-gate 141 will produce a low output and the NAND-gate 117 will produce a high output to effectuate the desired resetting of both the flip-flop 119 and the counter 122. Similarly, the initial reset pulse on the line 139 is supplied via the terminal F to the reset terminal of the flip-flop 69 (FIG. 4) in each channel so as to reset this device to the $\overline{Q}$ state, thereby also appropriately resetting the counter 32 to zero.

Details of the over/under temperature indicator 38 are shown in FIG. 6. Referring thereto, the signal on the line 25 is fed via a pair of resistors 145, 146 to complimentary inputs of a respective pair of operational amplifiers 147, 148. The other input terminal of each amplifier 147, 148, receives respective input voltages from associated potentiometers 149, 150 that are connected in a voltage divider circuit including fixed resistors 151, 152 and 153.

As described above, the signal on the line 25 is a voltage which varies as a function of the temperature in the vat 12, as measured by the probe 19. If the temperature should exceed a certain value, the over/under temperature lamp 39 flashes on and the horn 18 pulses. To accomplish this, the potentiometer 149 is set to supply to the amplifier 147 a reference voltage corresponding to the maximum acceptable temperature for the fat 13. If the sensed temperature exceeds this value, the voltage supplied on the line 25 will exceed the reference voltage supplied from the potentiometer 149 so that a high output is obtained from the amplifier 147 on a line 154. This enables a NAND-gate 155, the other input to which is connected via the terminal E to the square wave pulse source such as the oscillator 76 (FIG. 4). Accordingly, the output of the NAND-gate 155 on the line 156 alternately goes high and low at the supplied pulse rate. This alternating low signal is supplied via a diode 157 and the terminal C to the horn driver 36, which causes the horn 18 to sound at the corresponding pulse rate.

The alternating high and low signal on the line 156 is amplified by a transistor 158 cooperating with a pair of resistors 159, 160. The resultant signal is used alternately to turn on and off a transistor 161 that gates power to the over/under temperature lamp 39. Thus when an over-temperature condition is detected, the lamp 39 flashes and the horn 18 sounds.

Similarly, the lowest acceptable temperature is defined by the voltage supplied by the potentiometer 150. When the temperature-indicative voltage on the line 25 is below this reference level, the amplifier 148 will provide a high signal via a line 163 to enable a NAND-gate 164. The NAND-gate 164 supplies the pulses from the terminal E via another amplifier consisting of a transistor 165 and a pair of resistors 166, 167 to the base of a switching transistor 168 that has its collector connected directly to the lamp 39 and to ground via a resistor 169. The resultant switching of the transistor 168 again causes the over/under temperature lamp 39 to flash. The horn does not sound. Thus the flashing of the lamp 39 alone indicates the under temperature condition of the cooking medium in the vat 12.

Details of the horn driver 36 are shown in FIG. 7. The horn 18 is powered from an unregulated positive voltage source supplied via a terminal 175 and a diode 176 and filtered by a capacitor 177.

When the terminal C is high, a positive voltage supplied from the terminal A via a resistor 178 maintains a transistor 179 in the conductive state. Current flows through the transistor 179 from the diode 176 via a resistor 180 and a diode 181. This turns off a transistor 182 that switches current to the horn 18.

Whenever the terminal C goes low, the transistor 179 is cut off. As a result, the transistor 182 goes on so that current flows to the horn 18 via a path including the diode 176, a resistor 183, the horn 18, the transistor 182 and the diode 181. Thus the horn 18 goes on each time the terminal C goes low.

Although not the preferred mode of operation, the inventive cooking time control system 10 can be operated to indicate when the basket 15 has been in the vat 12 for a fixed time duration. To this end, a switch 185 (FIG. 4) is transferred from its normal position in contact with the terminal 185a into contact with the terminal 185b. This supplies nominal 1 second timing pulses from the oscillator 123 (FIG. 5) via the terminal D and the switch 185 to the line 127 instead of the cooking rate pulses from the voltage controlled oscillator 26. Accordingly, the counter 32 will count up to the preset number of 1 second clock pulses, and thus will produce the "DONE" signal on the line 37 a fixed period of time after the start button 16 is depressed. Of course, in this mode there will be no change in cooking time to compensate for temperature variation of the cooking medium in the vat 12.

In the holding timer 37, note that if the cooking of a second basket of food is completed during the holding time, i.e., while the counter 122 is counting, another signal will occur at the terminal H and the NAND-gate 117 will produce another high output. This will not change the state of the flip-flop 119 which already is in the Q̄ state, but it will reset the counter 122 to zero. Thus, the holding timer will begin a new timing period, so that the horn 18 only will be sounded at the end of the holding period associated with the food last to complete cooking. Further, if one basket is to be used only for turnovers, which have a very long holding time, then the input to terminal H from the associated channel may be disconnected so that no holding time signal is produced for that basket.

Intending to claim all novel, useful and unobvious features shown or described, the inventor makes the following claims:

I claim:

1. Apparatus for indicating the completion of cooking of a commodity in a cooking medium having variable temperature, comprising:
    temperature sensitive probe means for detecting the temperature of said medium during cooking and for providing a signal indicative of the cooking rate of said commodity at the detected temperature,
    cooking rate pulse generating means for producing a pulse train having a pulse rate proportional to said signal,
    a counter, and count control means for causing said counter to count said cooking rate pulses starting when cooking is begun, and
    cooking complete count detector means for detecting when said counter has reached a certain preset count, detection of said preset count indicating that cooking of said commodity is complete despite variation during cooking of the temperature of said cooking medium.

2. Apparatus according to claim 1 wherein said probe means comprises:
    a temperature transducer,
    first circuitry associated with said transducer for producing a voltage substantially linearly related to temperature as sensed by said transducer, and
    slope control circuitry for modifying the slope of said voltage as a function of temperature to compensate for the difference in cooking rate of said commodity at different temperatures, the output signal from said slope control circuitry being provided to said pulse generating means.

3. Apparatus according to claim 2 wherein said transducer comprises a resistance temperature transducer having a positive temperature coefficient.

4. Apparatus according to claim 3 wherein said transducer is a platinum resistance temperature transducer.

5. Apparatus according to claim 2 wherein said slope control circuitry includes means for selecting the desired voltage versus temperature slope, so that said slope can be set to represent the change of cooking rate as a function of temperature.

6. Apparatus according to claim 1 where in two or more commodities are cooked in said medium concurrently, further comprising:
    at least one additional like counter, count control means and cooking complete count detector means, said pulse train also being provided to said additional counter, said additional count control means causing said additional counter to start counting of said cooking rate pulses when cooking of a second commodity is begun, said additional count detector means detecting when said additional counter has reached a second preset count which indicates that cooking of said second commodity is complete.

7. Apparatus according to claim 6 wherein said second preset count is the same as said certain preset count.

8. Apparatus according to claim 6 wherein said second preset count is different from said certain preset count.

9. Apparatus according to claim 1 wherein said count detector means produces a "DONE" signal upon detecting that said counter has reached said certain preset count, and further comprising indicator means, actuated by said "DONE" signal to indicate that cooking is complete.

10. Apparatus according to claim 9 wherein said cooking medium is fat, wherein said commodity is a food, and wherein said count control means includes a start switch connected to initiate counting by said counter, said switch being actuated when said food is placed in said fat.

11. Apparatus according to claim 9 further comprising a holding timer, actuated by reset of said counter, for providing an indication that a certain fixed time period has elapsed since occurrence of said reset.

12. Apparatus according to claim 1 further comprising:
    a source of clock pulses at a fixed clock rate, and
    means for connecting said counter to count said fixed clock rate pulses instead of said cooking rate pulses, starting when cooking is begun, so that detection by said count detector means of said certain preset count indicates that cooking has proceeded for a fixed time duration.

13. Apparatus according to claim 1 further comprising over/under temperature indicator means, responsive to said signal from said probe means, for indicating when the detected temperature of said medium is above or below respective upper and lower temperature limits.

14. Apparatus for indicating the completion of cooking of food in a cooking medium contained in a cooking vessel, comprising:
    a temperature transducer situated to sense the temperature of the medium in said vessel during cooking,
    cooking rate slope control circuitry responsive to the output of said transducer for providing a signal that is proportional to the cooking rate of said food at the sensed temperature,
    cooking rate pulse generating means for providing a pulse train having a pulse rate proportional to said signal from said slope control circuitry,
    a start switch, a counter connected to count said pulses from said pulse generating means beginning when said switch is actuated, and cooking complete count detector, responsive to the contents of said counter, for providing a "DONE" signal upon detecting that said counter has reached a certain preset count indicating that cooking is complete.

15. Apparatus according to claim 14 wherein said temperature transducer is a platinum resistance temperature transducer having a positive temperature coefficient.

16. Apparatus according to claim 14 wherein said slope control circuitry comprises, first circuit means connected to said transducer for providing a first voltage that is substantially linearly related to sensed temperature in the range of temperature of said fat during cooking, and second circuit means receiving said first voltage and producing in response thereto a second voltage, said second voltage having a different slope of voltage as a function of temperature, said different slope being selectable to conform to the cooking rate as a function of temperature.

17. Apparatus according to claim 16 wherein said second circuit means comprises;

an operational amplifier, said first voltage being supplied to one input of said amplifier, said second voltage being obtained from the output of said amplifier, and means for adjusting the feedback of said operational amplifier to select said different slope.

18. Apparatus according to claim 17 further comprising means for providing a reference voltage to the reference input terminal of said operational amplifier, said reference voltage being adjustable to select the zero intercept of said second voltage.

19. Apparatus according to claim 14 further comprising count control circuitry including;

a gate, said pulse train being provided to the input of said gate, the output of said gate being provided to the count input of said counter, gate enabling circuitry responsive to a first actuation of said switch for enabling said gate to pass said pulse train to said counter, and responsive to occurrence of said "DONE" signal for disabling said gate to prevent additional pulses in said train from reaching said counter, thereby terminating said counting.

20. Apparatus according to claim 19 further comprising;

an indicator, turned on by said "DONE" signal, for indicating that cooking is complete, and wherein said count control circuitry also includes;

terminate circuitry responsive to a second actuation of said switch for turning off said indicator and for resetting said counter and count control circuitry to initiate counting once again the next time that said switch is actuated.

21. Apparatus according to claim 20 wherein said counter control circuitry includes;

abort prevention circuitry for inhibiting termination of counting by second actuation of said switch prior to occurrence of said "DONE" signal, and restart delay circuitry for preventing initiation of counting once again until a fixed delay time period has elapsed subsequent to said second actuation of said switch.

22. Apparatus according to claim 14 wherein said cooking vessel is a fat frier and wherein said medium is fat or oil.

23. Apparatus according to claim 14 wherein two or more batches of food can be cooked concurrently in said vessel, cooking of each separate batch beginning at a different time, said apparatus further comprising, a first indicator, turned on by occurrence of said "DONE" signal, said start switch being actuated when a first batch of food is placed in said vessel to be cooked so that turn-on of said first indicator indicates that cooking of said first batch of food is complete, a second start switch, said second start switch being actuated when a second batch of food is placed in said vessel to be cooked, a second counter connected to count said pulses from said pulse generating means beginning when said second start switch is actuated, and a second cooking complete count detector, responsive to the contents of said second counter, for providing a second "DONE" signal upon detecting that said second counter has reached a second preset count, and a second indicator, turned on by occurrence of said second "DONE" signal, for indicating that cooking of said second batch of food is complete.

24. Apparatus according to claim 23 further comprising a holding time, actuated by reset of all applicable said counters, for measuring a fixed time period beginning at such actuation, and a holding time indicator, turned on by said holding timer at the end of said fixed time period.

25. Apparatus according to claim 24 wherein said cooking vessel is a fat frier and wherein said medium is fat or oil.

26. Apparatus according to claim 14 further comprising;

over/under temperature indicator means, responsive to the signal from said slope control circuitry for indicating that the temperature of said cooking medium is above or below certain upper and lower limit temperatures.

27. Apparatus according to claim 26 wherein said transducer comprises a platinum resistance temperature transducer having a positive temperature coefficient, failure of said transducer being indicated as a high resistance resulting in an over-temperature indicator means.

28. Apparatus for determining the completion of cooking of a food in a vessel, the temperature within said vessel being variable during cooking, comprising.

a temperature transducer for sensing the temperature, within said vessel, to which said food is exposed, cooking rate means, responsive to the temperature sensed by said transducer, for providing a signal that is proportional to the cooking rate of said food at the sensed temperature, and means for integrating said cooking rate signal, and for providing a "DONE" signal when the integral reaches a certain preset value indicative of completion of cooking.

29. Apparatus according to claim 28 wherein said cooking rate means provides a recurrent signal having a recurrence rate proportional to the cooking rate at the sensed temperature, and wherein said integrating means comprises a counter for counting recurrences of said signal beginning when cooking starts, and a detector for providing said "DONE" signal when the contents of said counter reaches a preset number corresponding to the cooking complete integral value.

30. Apparatus according to claim 29 further comprising means for setting the proportionality between said recurrance rate and said sensed temperature, thereby programming said apparatus for the cooking rate for fried food.

31. Apparatus according to claim 30 wherein said cooking rate means comprises;
a circuit for providing a voltage that is proportioned to the temperature sensed by said transducer,
said means for setting comprising a slope control circuit for adjusting the slope of said voltage as a function of temperature, and
a voltage controlled oscillator having a frequency controlled by said slope-adjusted voltage, the output of said oscillator being said recurrent signal, said recurrence rate corresponding to the frequency of said oscillator.

32. A system for controlling the time of cooking of a food in a cooking medium, comprising:
first means, responsive to the temperature of said cooking medium, for generating a pulse train having a pulse rate proportional to the cooking rate of said food at the temperature of said medium, and
second means, connected to receive said pulse train from said first means, for indicating that cooking is complete by detecting when a preset number of pulses have been received subsequent to the start of cooking.

* * * * *